E. LE R. RYER.
EYE TESTING DEVICE.
APPLICATION FILED JULY 8, 1916.
1,204,690. Patented Nov. 14, 1916.
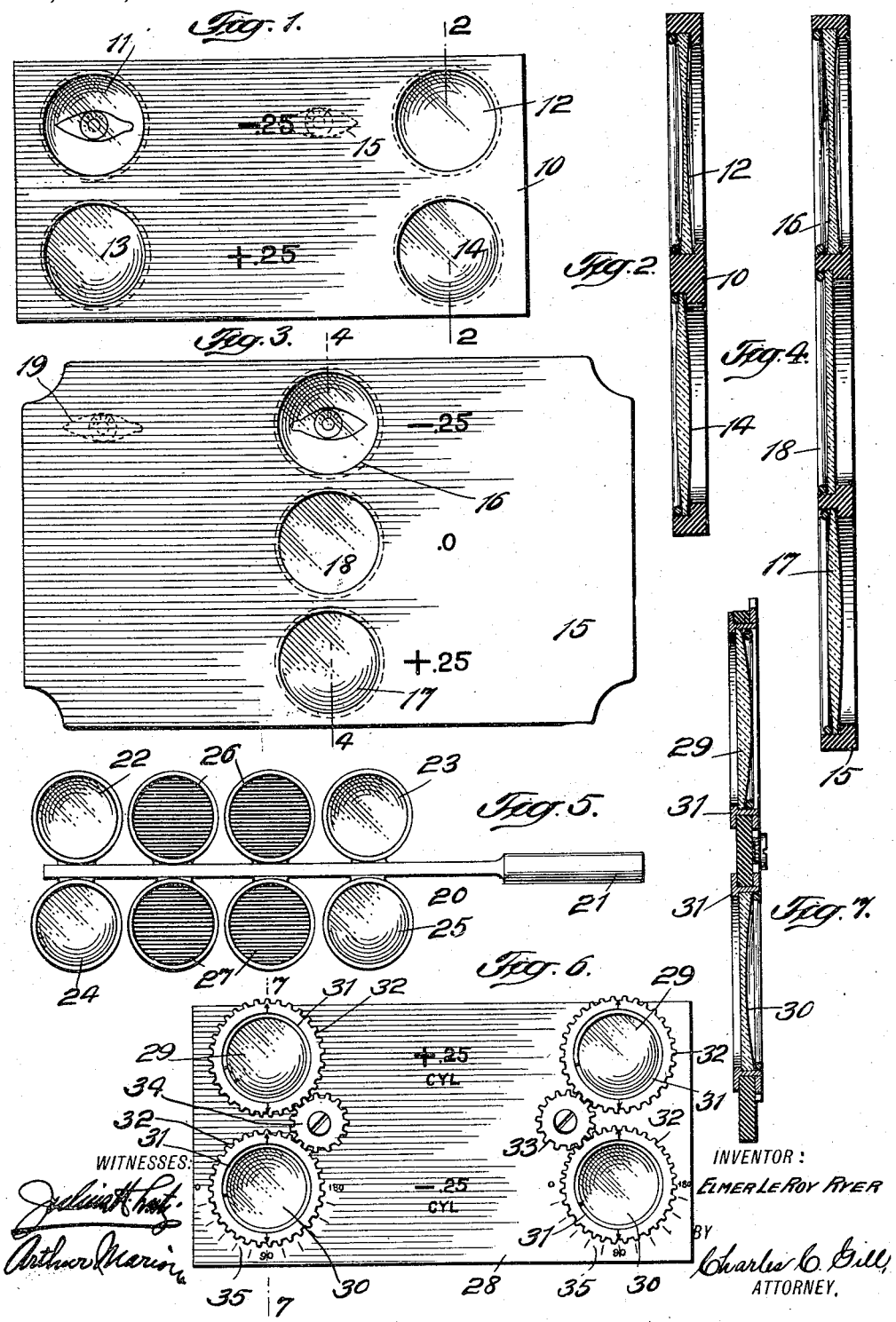
INVENTOR:
ELMER LE ROY RYER
BY
Charles C. Gill
ATTORNEY.
WITNESSES:

UNITED STATES PATENT OFFICE.

ELMER LE ROY RYER, OF HAWTHORNE, NEW YORK.

EYE-TESTING DEVICE.

1,204,690.  Specification of Letters Patent.  Patented Nov. 14, 1916.

Application filed July 8, 1916. Serial No. 108,085.

*To all whom it may concern:*

Be it known that I, ELMER LE ROY RYER, a citizen of the United States, and a resident of Hawthorne, in the county of Westchester and State of New York, have invented certain new and useful Improvements in Eye-Testing Devices, of which the following is a specification.

The invention pertains more particularly to means for verifying the optical correction of a visual defect arrived at upon testing the eyes for the purpose of providing an appropriate pair of glasses.

When eyes are being tested for proper glasses, the optometrist usually places a pair of frames in front of the eyes and applies various lenses to these frames for the purpose of ascertaining the character of lenses which might be required by the patient for a pair of glasses serving to correct the vision, and the result of this method is ordinarily termed the correction.

It is the purpose of my invention to provide a device which may be applied to the eyes, one after another, after the correction has been arrived at, for the purpose of testing or verifying the correction.

Optometrists at present attempt to verify or test the correction by means of single lenses and opaque and plane glass disks taken out of a trial case, but the means heretofore provided for the purpose are inconvenient of use and in the handling of the same too much time is required for shifting the lens and opaque disk from one eye to the other, and one disadvantage of the heretofore practised methods has been that no single device has been provided, so far as I know, whereby an optometrist may place a lens before one eye and at the same time blanket the other eye, and then quickly move a corresponding lens before said other eye and blanket the first-mentioned eye, or whereby an optometrist may place, say, a minus lens before one eye and at the same time blanket the other eye and then quickly move a plus lens before the same one eye and maintain the blanket in front of the said other eye. If any appreciable amount of time is allowed to elapse between applying, to test the correction, the required lenses, keeping one eye blanketed while the lens is before the other eye, the patient loses a sense of appreciation as to what effect the lenses may have had with respect to the vision at either eye.

The purpose of my invention, in the preferred embodiment of the same, is to provide a device which may be conveniently handled carrying lenses, both plus and minus and spherical or cylindrical, as may be required, with the use of which an optometrist may readily and quickly verify or test the correction made for a pair of eyes, the device of my invention comprising means for holding the verifying or testing lenses and also for blanketing one eye while the appropriate lens is placed in front of the other eye.

The device of my invention may be of varied construction, but preferably will be in the form of a sheet or block or frame of vulcanite or other material and black in color, and this block in the preferred form of my invention will carry in its upper opposite portions two lenses of equal character, such as two minus lenses, and in its lower opposite portions two lenses of equal character, as two plus lenses. When a minus lens is before either eye, the block will blanket the other eye, and likewise when a plus lens is placed in front of either eye, the block will blanket the other eye. I preferably have the two equal lenses, minus and plus, in horizontal line with each other, and more widely separated than the pupilary distance between a pair of eyes, and I also have the minus and plus lenses in vertical line with each other. In the construction presented by me when one lens is before either eye, the block or frame blankets the other eye, and this remains true whether I shift the block or frame vertically so as to carry, for instance, a minus lens from one eye and place a plus lens before the same eye, or by a simple quick horizontal movement of the device shift one minus lens or one plus lens from one eye and place a minus or plus lens in front of the other eye. I may, however, employ only one minus lens and one plus lens, and in this arrangement I prefer that the lenses be arranged in vertical line. I may also carry the lenses upon a skeleton frame in lieu of mounting them in a block or board; in such instance said frame will carry the means for blanketing either eye while a lens is before the other eye. In the preferred construction, there will be at least two lenses, associated with a member, either the body carrying the lenses or applied thereto, for blanketing one eye while the other eye is being tested.

The invention will be fully understood from the detailed description hereinafter presented, reference being had to the accompanying drawings, in which:

Figure 1 is a front elevation of a block or board carrying two pairs of testing lenses, one pair being minus and one pair plus, embodying my invention, the minus lenses being in horizontal line with each other and separated by a space greater than the pupilary distance between a pair of eyes, and the plus lenses likewise being in line with each other and separated by a space greater than the pupilary distance between a pair of eyes; in Fig. 1 the device is represented as having one minus lens placed in front of an eye with the block or board blanketing the other eye, which is indicated by dotted lines; Fig. 2 is a vertical section through the same, taken on the dotted line 2—2 of Fig. 1 and being on a larger scale; Fig. 3 is a front elevation of a modified form of the invention, the block or board having one minus lens, one plus lens and one plane glass disk, the block or board being of sufficient length to blanket one eye when the other eye is being tested, as the indication of the two eyes illustrates; Fig. 4 is a vertical section on an enlarged scale through the same, taken on the dotted line 4—4 of Fig. 3; Fig. 5 is a front elevation presenting a modified form of the invention possessing the essential characteristics of the device shown in Fig. 1, but showing the lenses as mounted upon a horizontal frame or rod with black disks between the same for blanketing one eye while the other eye is being tested; Fig. 6 is an elevation of an embodiment of my invention corresponding substantially with Fig. 1, but employing rotary cylindrical lenses instead of spherical lenses, such as are shown in Figs. 1 to 5 inclusive, and Fig. 7 is a vertical section, on an enlarged scale, through the same, taken on the dotted line 7—7 of Fig. 6.

In the drawings, referring to Figs. 1 and 2, 10 designates the body portion of the device, said body portion being in the outline of an oblong and preferably formed of some light-weight non-transparent material, such as fiber, hard rubber, celluloid, metal or the like. The body 10 is in the general form of a sheet or block and elongated horizontally, and said body is formed in its corner portions with apertures within which are secured lenses 11, 12, 13, 14, the lenses 11, 12 being in horizontal line with each other and the lenses 13, 14 being below the lenses 11, 12 and also in horizontal line with each other. The lenses 11, 12 are indicated as —.25 lenses, and the lenses 13, 14 are indicated as +.25 lenses. The length of the body 10 is greater than the average pupilary distance between pairs of eyes, and in Fig. 1 I indicate one eye of a patient as being behind the lens 11 and the other eye, indicated at 15, as being behind the body 10 and shut off from vision or blanketed thereby. The average pupilary distance between pairs of eyes is 2⅜ths inches, such distance rarely being less than two inches or greater than three inches, and hence I give to the body portion 10 a length sufficient to always blanket either eye when a lens is before the other eye.

An example of the use of the device shown in Fig. 1 will serve to illustrate the operation of said device and its utility, and the following may be given as such example: Should an optometrist find by the usual test that a +1.00 diopter lens seems to correct a visual defect, he should verify this correction, and the device of my invention is provided for this purpose. Prudence demands that the optometrist try a lens weaker and another stronger before the eyes of the patient and note whether either lens improved or affected the +1.00 D. The optometrist should also ascertain whether the plus and the minus lens respectively affects one eye as much and in the same manner as it does the other eye. In Fig. 1 I illustrate the device of my invention as being applied to verify the correction of a pair of eyes, the illustration showing a —.25 lens applied in front of one eye, while the body 10 shuts off or blankets the other eye, and it will be understood that this minus lens applied to the +1.00 D. reduces the same to +0.75. After the test has been made with the lens 11 over one eye, the body 10 may be quickly shifted vertically to carry the plus lens 13 before the same eye, the left eye 15 in each instance being shut off or blanketed by the frame of the device.

It will be observed that only a short movement of the body 10 is required to remove the lens 11 from the right eye and expose the lens 13 in front of the same eye, and this quick action is one of the important features of the invention. The optometrist may make a further test at the right eye by shifting the body 10 farther toward the left so as to expose the right eye from behind the body 10, so that the patient may have an opportunity to determine whether either the lens 11 or the lens 13 benefited the vision, and if so which lens afforded the greater benefit, the left eye 15 in the meantime remaining blanketed by the body 10. After the correction for the right eye has been tested, the optometrist may follow the method just indicated in testing the correction for the left eye, and it will be seen that only a slight lateral shifting motion in the body 10 is required to bring the lens 12 or 14 in front of the left eye while said body at the same time blankets the right eye. By a limited vertical movement of the body 10, the lens 12 may be shifted from in front of the left eye, and the lens 14 placed in front of said eye, the right eye remaining blanketed, and likewise the body 10 may be shifted toward the right a sufficient distance to expose the left eye, the right eye however remaining blanketed. Another method of using the device shown in Fig. 1 will be by placing the lens 11 over one eye and when the condition there has been observed, shifting the body 10 laterally to bring the lens 12 over the other eye, said body then blanketing the first eye tested. In the illustration the lens 11 is shown as in front of the right eye, while the body 10 blankets the left eye, and only a slight movement is required to bring the lens 12 in front of the left eye, while said body 10 blankets the right eye. After the minus lenses have been made use of as just explained, a similar operation may be followed with respect to the plus lenses 13, 14. The plus lens (+0.25) added to the +1.00 D. increases the same to +1.25. The optometrist will carefully ascertain whether the correction is improved or not by the application of the minus and plus lenses in front of the eyes of the patient, one eye always being shut off or blanketed while a lens is before the other eye, and in doing this he should note whether either lens affects one eye as much as and in the same manner as it affects the other eye.

The testing device shown in Fig. 1 is a self-contained easily handled instrument, and the quickness and ease with which the device may be applied to practical use will be appreciated without extended comment. The quick removal of a lens from one eye and the application of another lens to the same or the other eye, is a matter of great importance, and with the device of my invention the testing may be carried on rapidly and with no appreciable loss of time between changes.

The device illustrated in Figs. 3 and 4 comprises a body portion 15 of any suitable material and, as in Fig. 1, elongated horizontally to a sufficient extent to blanket one eye when a lens is placed in front of the other eye. In the construction shown in Fig. 3 the device is provided with a minus lens 16, a plus lens 17 and a plane glass disk 18, these features 16, 17, 18 being in vertical line and at the middle portion of the body 15. The device shown in Fig. 3 carries only one minus lens and one plus lens instead of two lenses of each kind, as in Fig. 1. During the testing the minus lens may, for illustration, be applied in front of the left eye, and when this is done the material of the body 15 blankets the right eye, which I indicate at 19. When the right eye is to be tested, the device is shifted laterally to bring the lens 16 in front of the right eye 19, and when this is done the body 15 will shut off or blanket the left eye. The same method of use of the device applies to the plus lens 17. In the device shown in Fig. 3 I add the plane glass disk 18 as a means for increasing the accuracy of the test. The value of the plane disk 18 may be appreciated when it is remembered that any glass, as the lenses, held before an eye, affects the eye outside of its focal value by absorbing and reflecting some light. For illustration, if we add the +.25 to the +1.00 D. and ask whether vision is better with it on or off, the test is not strictly accurate because of the added quantity of glass with the resultant diminution of light, but if after the +.25 lens has been applied, the optometrist then shifts the device to carry the plane disk 18 before the eye, the comparison may be accurately determined, because with the plane disk or slab we change the focal value while still adding substantially the same amount of glass before the eye. The plane glass disk or slab 18 serves as a means for verifying the test with either the plus lens or minus lens, and its presence in the device would be preferred by some optometrists. It is obvious that the plane disk or slab 18 may be made use of as a part of the device, whether the device employs one minus lens and one plus lens, as in Fig. 3, or two minus lenses and two plus lenses, as in Fig. 1.

In Fig. 5 I illustrate a further modification of my invention in which the body of the device is shown as a skeleton frame 20 having a handle 21 and carrying two minus lenses 22, 23,—one for each eye to be tested, two plus lenses 24, 25,—one for each eye to be tested, and two sets of non-transparent or blanketing disks 26, 27. The plus and minus lenses are, respectively, more widely separated than the average pupilary distance between pairs of eyes, and are in the same relation in which the plus and minus lenses are shown in Fig. 1, and the non-transparent or blanketing disks 26, 27 perform the same duty as the body of the device shown in Fig. 1. The method of employing the device shown in Fig. 5 is identical with that represented in Fig. 1, and said device shown in Fig. 5 is practically the same device as that shown in Fig. 1, except that mechanically it has been given a skeleton construction in lieu of the solid body construction represented in Fig. 1.

In Figs. 6 and 7 I illustrate my invention as employed in connection with rotary cylindrical lenses in lieu of the spherical lenses illustrated in Figs. 1 to 5 inclusive. In Fig. 6, 28 denotes the body of the device, corresponding with the body 10 in Fig. 1, and said body 28 is apertured in its upper and lower corner portions and at said portions carries respectively plus cylindrical lenses 29 and minus cylindrical lenses 30, the axes of said lenses all being parallel, or the axes of one pair of lenses standing at right angles to the axes of the other pair of lenses, as may be required. Cylindrical lenses require in their use a rotary motion so as to change the position of their axes before the eye, and in this instance I mount the cylindrical lenses in metal rings 31, and at one side of the body 28 I secure to each of said rings an auxiliary ring 32 having on its outer edge gear teeth, so that the rings are converted into gear wheels. The two gear wheels at one end of the body 28 are engaged by an intermediate pinion 33 and the gear wheels at the other end of the body 28 are engaged by an intermediate pinion 34, and the purpose of the pinions 33, 34 is to compel the lenses to have corresponding rotation in the same direction. The upper gear wheels 32 extend upwardly beyond the upper edge of the body 28, and this is for the purpose of permitting the optometrist by moving his finger or thumb against the exposed portions of the gear wheels, to conveniently rotate the lenses so as to change the axes thereof. I will preferably apply on the body 28 below the lower cylindrical lenses a scale 35 as a guide to the optometrist in ascertaining the axial lines of the lenses in the different positions of the same.

The device shown in Fig. 6 will be utilized in the same manner that the device shown in Fig. 1 is employed, the difference being that the device of Fig. 1 carries plus and minus spherical lenses, while the device shown in Fig. 6 carries plus and minus cylindrical lenses. The plus and minus values of the lenses carried by the device may vary and an optometrist may possess himself with a set of devices having plus and minus spherical lenses of such values as may be deemed expedient and also with a set of the devices carrying cylindrical lenses varying in plus and minus values. In the constructions shown in Figs. 1, 5 and 6, the plus and minus lenses are shown, respectively, as more widely separated than the average pupilary distance between pairs of eyes, and hence by a short movement the appropriate lens may be placed before one eye while at the same time the body of the device blankets the other eye.

The invention will be fully understood, I believe, from the foregoing description without further detailed explanation. The device is of simple character, but of pronounced utility and I believe the advantages and uses of the device will be appreciated.

What I claim as my invention and desire to secure by Letters Patent, is:

1. An eye-testing device of the character described, comprising a body-portion carrying a lens and embracing means for blanketing one eye while the lens is applied before the other eye.

2. An eye-testing device of the character described, comprising a body portion carrying plus and minus lenses and embracing means for blanketing one eye while either of said lenses is applied before the other eye.

3. An eye-testing device of the character described, comprising a non-transparent body portion carrying a lens, said body portion being of sufficient length to blanket either eye when said lens is applied before the other eye.

4. An eye-testing device of the character described, comprising a non-transparent body-portion carrying plus and minus lenses, said body portion being of sufficient length to blanket either eye when either of said lenses is placed before the other eye.

5. An eye-testing device of the character described, comprising a non-transparent body portion carrying plus and minus lenses and a plane glass slab, said body-portion being of sufficient length to blanket either eye when either of said lenses or said slab is placed before the other eye.

6. An eye-testing device of the character described, comprising a non-transparent body-portion carrying a lens and a plane glass slab, said body portion being of sufficient length to blanket either eye when either said lens or said slab is placed before the other eye.

7. An eye-testing device of the character described, comprising a body carrying at its opposite side portions corresponding lenses, one for each eye, more widely separated than the average pupilary distance between pairs of eyes, said body being adapted to blanket either eye when the appropriate lens is applied before the other eye.

8. An eye-testing device of the character described, comprising a body carrying at its opposite side portions corresponding minus lenses, one for each eye, more widely separated than the average pupilary distance between pairs of eyes, and corresponding plus lenses, one for each eye, more widely separated than the average pupilary distance between pairs of eyes, said body being adapted to blanket either eye when either of the appropriate lenses is applied before the other eye.

9. An eye-testing device of the character described, comprising a body-portion of non-transparent material carrying minus and plus lenses, one vertically above the other, said body portion being of sufficient length and width to blanket one eye when either of said lenses is placed before the other eye.

10. An eye-testing device of the character described, comprising a body carrying at its opposite side portions corresponding minus rotary cylindrical lenses, one for each eye, more widely separated than the average pupilary distance between pairs of eyes, and corresponding plus rotary cylindrical lenses, one for each eye, more widely separated than the average pupilary distance between pairs of eyes, said body being adapted to blanket either eye when either of the appropriate lenses is applied to the other eye.

Signed at New York city, in the county of New York and State of New York, this 7th day of July A. D. 1916.

ELMER LE ROY RYER.

Witnesses:
CHAS. C. GILL,
ARTHUR MARION.